US009383471B2

(12) United States Patent
Tamanaja

(10) Patent No.: US 9,383,471 B2
(45) Date of Patent: Jul. 5, 2016

(54) METHOD AND UNDERWATER NODE FOR SEISMIC SURVEY

(75) Inventor: Ivan Torres Tamanaja, Mexico City (MX)

(73) Assignee: CGG SERVICES SA, Massy (FR)

( * ) Notice: Subject to any disclaimer, the term of this patent is extended or adjusted under 35 U.S.C. 154(b) by 806 days.

(21) Appl. No.: 13/615,994

(22) Filed: Sep. 14, 2012

(65) Prior Publication Data

US 2014/0078861 A1     Mar. 20, 2014

(51) Int. Cl.
*G01V 1/38*     (2006.01)

(52) U.S. Cl.
CPC .................... *G01V 1/3852* (2013.01)

(58) Field of Classification Search
CPC ..... G01V 1/38; G01V 1/3808; G01V 1/3852; G01V 1/36; G01V 1/3843; G01V 1/201; G01V 1/3817; G01V 1/3826; G01V 1/28; G01V 1/3835; G01V 1/003; G01V 1/18; G01V 1/3861; G01V 1/24; G01V 1/282; G01V 1/364; G01V 1/16; G01V 1/20; G01V 1/22; G01V 1/30; G01V 1/006; G01V 1/02; G01V 1/137; G01V 1/186; G01V 1/005; G01V 1/159; G01V 1/189; G01V 1/247; G01V 1/284; G01V 1/288; G01V 1/303; G01V 1/32; G01V 1/325; G01V 1/345; G01V 1/001; G01V 1/13; G01V 1/133; G01V 1/162; G01V 1/164; G01V 1/184; G01V 1/223; G01V 1/301; G01V 1/305; G01V 1/308; G01V 1/368; G01V 2210/56; G01V 2210/1293; G01V 2210/60; B29K 2075/00; B29K 2083/00; B29K 2995/0093; B65G 67/60; F16L 1/14; F16L 1/20; F16L 1/235; F16L 3/08; F16L 3/12; F16L 3/18; F16L 3/20; G01P 15/125; G01P 15/131; G01P 2015/0837; G01P 2015/0882; G01S 19/13; G01S 15/02; G01S 15/74; G01S 15/876; G01S 15/88; G01S 15/89; G01S 3/808; G01S 3/8083; G01S 5/0054; G01S 5/18; G01S 7/003; G01S 7/521; F21W 2131/10; F21Y 2101/02; F28D 2021/0022; F28F 13/06; F28F 3/083; F28F 9/0075; G01B 7/00; G01C 19/00; G01C 21/00; G01C 21/203; G01D 5/12; G01N 19/08; G01N 33/1886; G01R 15/24; G01R 31/021; G01R 31/08; G01R 31/083; G05B 15/02; G05D 1/0206; G05D 1/0692; G08G 3/02
USPC ............. 367/188, 15–24, 14, 7, 13, 118, 125, 367/127, 149, 153, 156, 168, 76, 87; 702/14, 16, 17, 18, 11, 5, 58, 6; 701/21, 301; 29/428, 426.1, 452, 714, 29/823; 114/312, 245, 253, 337, 338; 405/166, 158, 168.1, 209; 156/244.12
See application file for complete search history.

(56) References Cited

U.S. PATENT DOCUMENTS 3,554,527 A * 1/1971 Hall .............................. 267/116
4,138,658 A * 2/1979 Avedik et al. .................. 367/15

(Continued)

FOREIGN PATENT DOCUMENTS

EP     1 217 390 A1     6/2006
EP     2372402 A1     10/2011

(Continued)

OTHER PUBLICATIONS

Lauga, The Swimming Torus, MAE 156B—Fundamental Principles of Mechanical Design II, University of California, San Diego, 2008.*

(Continued)

*Primary Examiner* — Luke Ratcliffe
*Assistant Examiner* — Amienatta M Ndure Jobe
(74) *Attorney, Agent, or Firm* — Patent Portfolio Builders PLLC

(57) ABSTRACT

A marine node for recording seismic waves underwater. The node includes a main body having a torus shape; a central body provided inside a space defined by the main body and connected to the main body through at least a link; a first thruster provided in the main body and configured to propel the main body along a central axis (Z) of the main body; and a seismic sensor configured to record the seismic waves underwater.

20 Claims, 9 Drawing Sheets

(56) References Cited

U.S. PATENT DOCUMENTS

| | | | | |
|---|---|---|---|---|
| 4,300,220 | A | * | 11/1981 | Goff et al. .................... 367/188 |
| 4,377,982 | A | * | 3/1983 | Gongwer ...................... 114/312 |
| 4,951,264 | A | * | 8/1990 | Yamamoto ...................... 367/15 |
| 5,442,590 | A | * | 8/1995 | Svenning et al. ............... 367/15 |
| 5,713,293 | A | * | 2/1998 | Shiffler et al. ............. 114/61.27 |
| 6,044,745 | A | * | 4/2000 | Hickey ......................... 89/1.809 |
| 6,625,083 | B2 | | 9/2003 | Vandenbroucke |
| 6,932,185 | B2 | * | 8/2005 | Bary et al. .................... 181/122 |
| 6,951,138 | B1 | | 10/2005 | Jones |
| 7,496,002 | B2 | * | 2/2009 | Vosburgh ..................... 367/188 |
| 7,586,809 | B2 | * | 9/2009 | Luc ................................. 367/15 |
| 8,579,545 | B2 | * | 11/2013 | Jewell et al. ................. 405/158 |
| 2005/0052951 | A1 | * | 3/2005 | Ray et al. ..................... 367/188 |
| 2006/0120216 | A1 | * | 6/2006 | Ray et al. ....................... 367/15 |
| 2008/0068926 | A1 | * | 3/2008 | Chambers et al. ................ 367/7 |

FOREIGN PATENT DOCUMENTS

| | | |
|---|---|---|
| WO | 01/37002 A1 | 5/2001 |
| WO | 2007/040411 A1 | 4/2007 |
| WO | 2013/041838 A2 | 3/2013 |

OTHER PUBLICATIONS

International Search Report mailed Aug. 5, 2014, in related International Application No. PCT/EP2013/068995 (U.S. Pat. No. 6,625,083, cited in this ISR, was previously filed with the IDS dated Sep. 14, 2012).

Written Opinion mailed Aug. 5, 2014, in related International Application No. PCT/EP2013/068995.

* cited by examiner

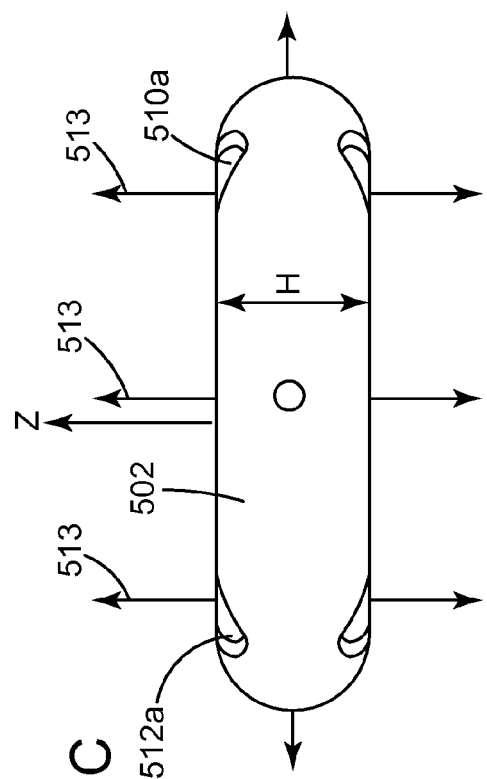

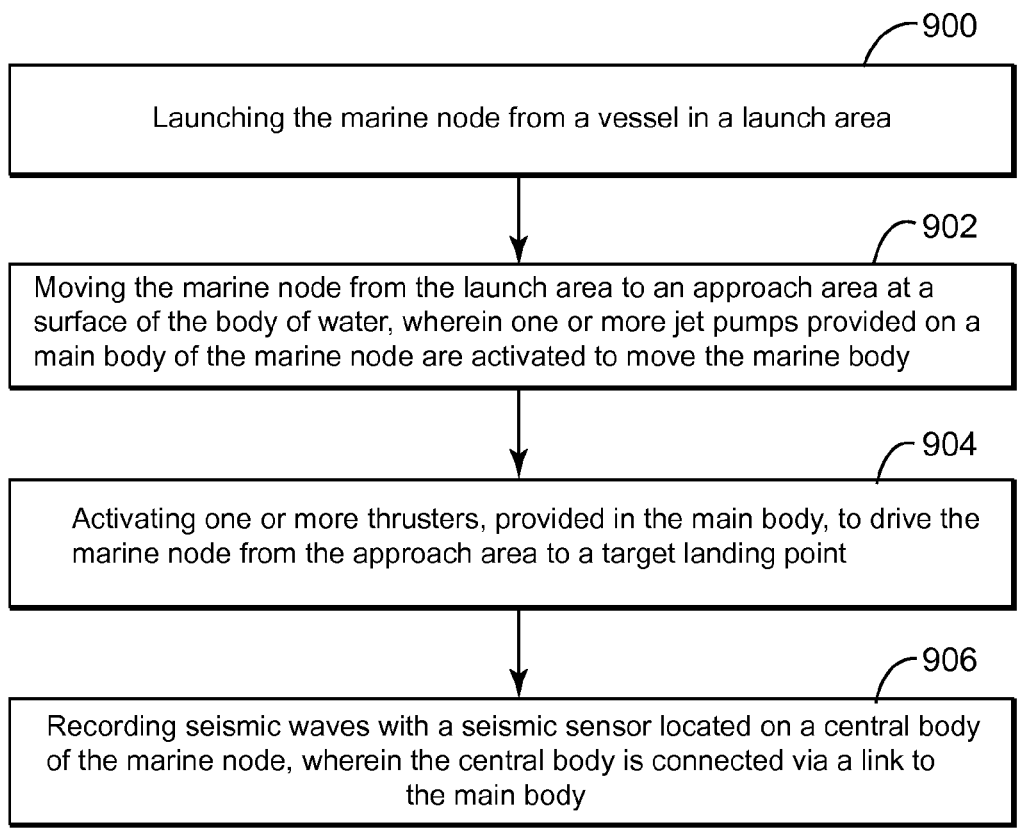

METHOD AND UNDERWATER NODE FOR SEISMIC SURVEY

BACKGROUND

1. Technical Field

Embodiments of the subject matter disclosed herein generally relate to methods and systems, and more particularly to mechanisms and techniques, for performing a marine seismic survey using underwater nodes that carry appropriate seismic sensors.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration for determining the properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional marine system for generating seismic waves and recording their reflections off the geological structures present in the subsurface is illustrated in FIG. 1. A vessel 10 tows an array of seismic receivers 11 located on streamers 12. The streamers may be disposed along any depth profile relative to the surface 14 of the ocean. The streamers may have spatial arrangements other than horizontal. The vessel 10 also tows a seismic source array 16 configured to generate a seismic wave 18. The seismic wave 18 propagates downward and penetrates the seafloor 20 until eventually a reflecting structure 22 (reflector) reflects the seismic wave. The reflected seismic wave 24 propagates upward until it is detected by the receiver 11 on the streamer 12. Based on further analyses of the data collected by the receiver 11, an image of the subsurface is generated. The seismic source array 16 includes plural individual source elements.

FIG. 2 shows a vessel 40 towing two cables 42 at respective ends with deflectors 44. Plural lead-in cables 46 are connected to streamers 50. The plural lead-in cables 46 are also connect to the vessel 40. The streamers 50 are maintained at desired distances from each other by separation ropes 48. Plural individual source elements 52 are also connected to the vessel 40 and to the lead-in cables 46 via ropes 54.

However, this traditional configuration is expensive because the cost of streamers is high. In addition, this configuration might not provide accurate results because water surface noise may interfere with recordings. To overcome these problems, new technologies deploy plural seismic sensors on the bottom of the ocean to create a coupling between the sensors and the ocean floor.

One such technology is incorporated into the ocean bottom station (OBS). An OBS is capable of providing better data than conventional acquisition systems because of its wide-azimuth geometry. Wide-azimuth coverage is helpful for imaging beneath complex overburdens like those associated with salt bodies. Salt bodies act like huge lenses, distorting seismic waves that propagate through them. To image subsalt targets, it is preferable to have the capability to image through complex overburdens, but even the best imaging technology alone is not enough. Good illumination of the targets is necessary. Conventional streamer surveys are operated with a single seismic vessel and have narrow azimuthal coverage. If either the source or the receiver is located above an overburden anomaly, some targets are likely to be poorly illuminated. OBS nodes can achieve wide-azimuth geometry.

Additionally, OBS nodes are much more practical in the presence of obstacles such as production facilities. For the purpose of seismic monitoring with repeat surveys (4D), OBS nodes have better positioning repeatability than streamers. Furthermore, OBS nodes provide multi-component data. Such data can be used for separating up- and down-going waves at the seabed, which is useful for multiple attenuations and for imaging using the numerous pieces of data. In addition, multi-component data allows for the recording of shear waves, which provide additional information about lithology and fractures and sometimes allow imaging of targets that have low reflectivity or are under gas clouds.

U.S. Pat. No. 6,932,185, the entire content of which is incorporated herein by reference, discloses this kind of node. In this case, the seismic sensors 60 are attached to a heavy pedestal 62, as shown in FIG. 3 (which corresponds to FIG. 4 of the patent). A station 64 that includes the sensors 60 is launched from a vessel and arrives, due to its gravity, on the ocean bottom. The station 64 remains permanently on the ocean bottom. Data recorded by the sensors 60 is transferred through a cable 66 to a mobile station 68. When necessary, the mobile station 68 may be brought to the surface to retrieve the data.

Although this method achieves better coupling between the seabed and the sensors, the method is still expensive and inflexible because the stations and corresponding sensors are left on the seabed. Also, the landing point of the station 64 cannot be controlled.

An improvement to this method is described in European Patent No. EP 1 217 390, the entire content of which is incorporated herein by reference. In this document, a sensor 70 (see FIG. 4) and a memory device 74 are removably attached to a pedestal 72. After recording the seismic waves, the sensor 70 and memory device 74 are instructed by a vessel 76 to detach from the pedestal 72 and rise to the ocean surface 78 to be picked up by the vessel 76.

However, this configuration is not very reliable, because the mechanism maintaining the sensor 70 connected to the pedestal 72 may fail to release the sensor 70. In addition, the sensor 70 and pedestal 72 may not reach their intended positions on the bottom of the ocean. Furthermore, the pedestals 72 are left behind, thereby contributing to both ocean pollution and a seismic survey price increase, which are both undesirable effects.

Accordingly, it would be desirable to have systems and methods that use inexpensive and non-polluting nodes for reaching a desired point on the seabed and recording seismic waves.

SUMMARY

According to an exemplary embodiment, there is a marine node for recording seismic waves underwater. The node includes a main body having a torus shape; a central body provided inside a space defined by the main body and connected to the main body through at least a link; a first thruster provided in the main body and configured to propel the main body along a central axis (Z) of the main body; and a seismic sensor configured to record the seismic waves underwater.

According to another exemplary embodiment, there is a marine node for recording seismic waves underwater. The node includes a main body having a torus shape; a central body provided inside a space defined by the main body and connected to the main body through at least a link; three thrusters provided inside the main body and configured to propel the main body along a central axis (Z) of the main body; three jet pumps provided inside the main body and configured to propel the main body in a plane XOY substantially perpendicular to the central axis (Z); and a seismic sensor provided on the central body and configured to record the seismic waves underwater.

According to still another exemplary embodiment, there is a method for driving a marine node between first and second points in a body of water for a marine seismic survey. The method includes a step of launching the marine node from a vessel in a launch area; a step of moving the marine node from the launch area to an approach area at a surface of the body of water, wherein one or more jet pumps provided inside a main body of the marine node are activated to move the marine node; a step of activating one or more thrusters, provided inside the main body, to drive the marine node from the approach area to a target landing point; and a step of recording seismic waves with a seismic sensor located on a central body of the marine node, wherein the central body is connected via a link to the main body. The main body has a torus-shape.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A-D illustrate a marine node having a torus shape according to an exemplary embodiment;

FIG. 9 is a flowchart of a method for driving a marine node according to an exemplary embodiment.

DETAILED DESCRIPTION

Figure 1:
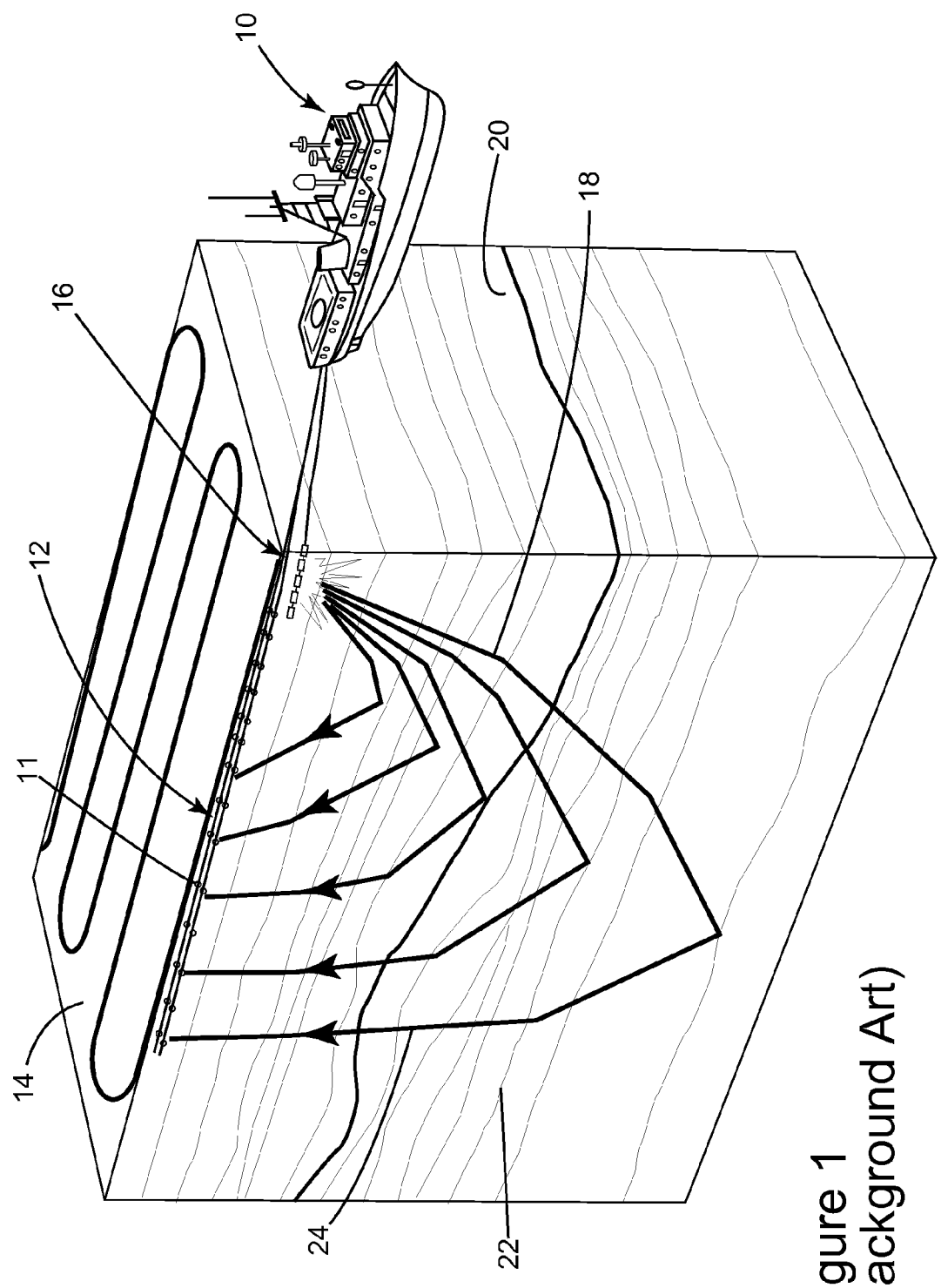
FIG. 1 is a schematic diagram of a conventional seismic survey system.
Figure 2:
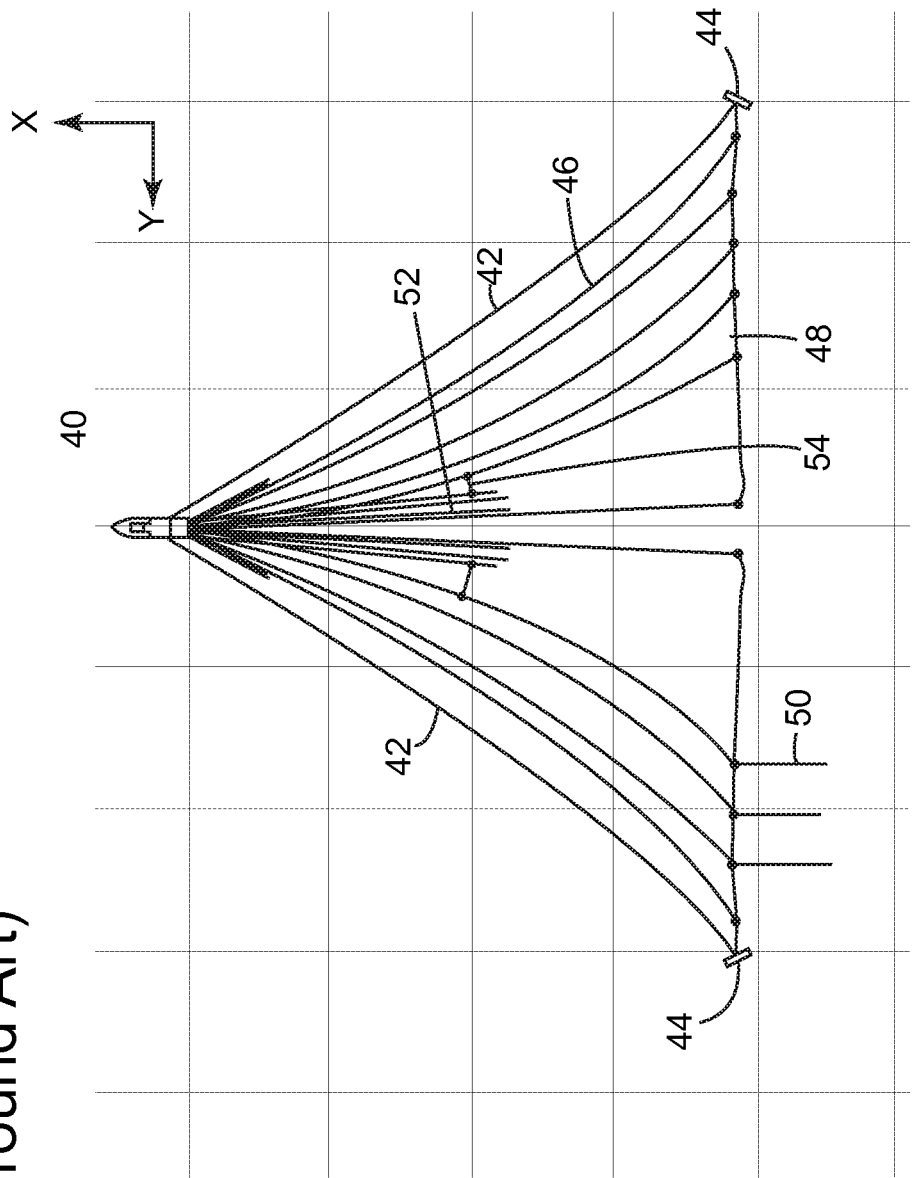
FIG. 2 illustrates a traditional arrangement of streamers and source arrays towed by a vessel.
Figure 3:
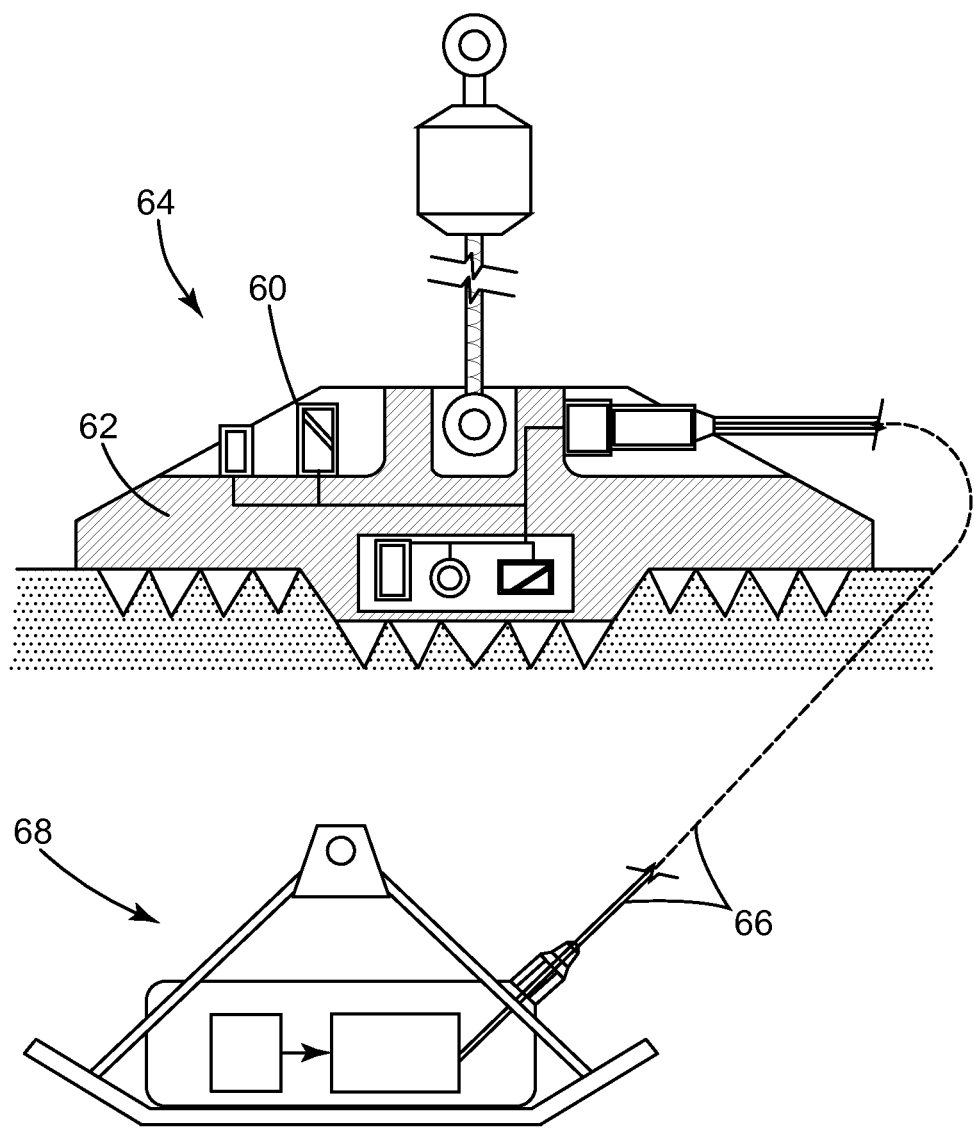
FIG. 3 is a schematic diagram of a station that may be positioned on the bottom of the ocean for seismic data recording.
Figure 4:
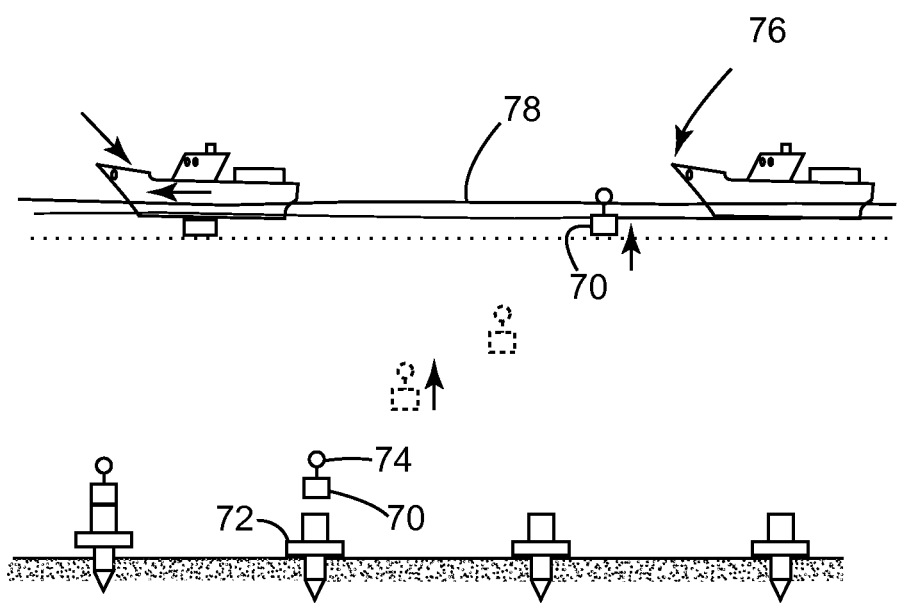
FIG. 4 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Rather, the scope of the invention is defined by the appended claims. The following embodiments are discussed, for simplicity, with regard to the terminology and structure of a torus-shaped, water-coupled, seismic node having seismic sensors and being deployed underwater for performing seismic recordings. However, the embodiments to be discussed next are not limited to a torus-shaped seismic node.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic sensors at or close to the seabed. According to an exemplary embodiment, such a seismic system includes plural inexpensive seismic nodes, each having one or more seismic sensors. The seismic sensors may include a hydrophone, geophone, accelerometers, electromagnetic sensors, etc.

A novel seismic node is illustrated in FIGS. 5A-C. The node 500 has a main body 502 having a torus (i.e., a surface of revolution generated by revolving a circle in a three-dimensional space about an axis coplanar with the circle, e.g., a doughnut) shape. The interior of the main body is a toroid. The main body may have other shapes, e.g., a deformed torus, etc. A central body 504 is inside a space 503 defined by the main body 502. The central body 504 is attached to the main body 502 through at least one link 506. FIG. 5A shows three links 506. However, more or fewer links may be used. The central body 504 may be rigidly attached to the main body or it may be allowed to move relative to the main body. In one application, a vertical position of the central body relative to the main body may be controlled, either be a control unit located on the node or based on instructions received from a vessel. The links may be made of metal, plastic, composite materials, etc. At least one link may have an inside channel (not shown) to allow a cable (not shown) to connect the main body to the central body. The cable may provide electrical power and/or data transmission capabilities. In one application, a central axis of the main body coincides with a central axis of the central body.

The main body 502 may include two or more thrusters (i.e., propulsion devices) 508, 510 or 512 for providing a desired upward force $F_u$ or downward force $F_d$. As discussed in the next paragraph, each thruster may be equipped with a device, e.g., a servo-mechanism, for tilting the thruster relative to a central axis Z so that the node can move in a horizontal plane. The embodiment of FIGS. 5A-C includes three thrusters at equal angles (i.e., 120°) relative to the central (vertical) axis Z. According to an exemplary embodiment, a thruster may include an electric motor connected to a propeller. Other devices (e.g., jet pumps) may be used as thrusters, as will be recognized by those skilled in the art. Plural thrusters may be independently controlled, i.e., control of one thruster may be different from control of an adjacent thruster.

The thrusters may be within the main body of the node so that the axial direction 513 of the thrusters is parallel with the central axis Z of the main body. In another application, the axial directions of the thrusters may make an angle with the central direction of the main body. However, for this last embodiment, only part of the forces generated by the thrusters is used to move the node up or down.

The thrusters 508, 510 and 512 are in corresponding thruster channels (508a, 510a and 512a) formed in the main body 502 as shown in FIG. 5B. Such thruster channels extend all the way through the height H of the main body 502. Thus, water passes through the thruster channels when the node 500 is traveling underwater. The thrusters ensure that the node is capable of moving up or down as decided by a control unit to be discussed later. Also, by actuating only two of the three thrusters, the orientation and attitude (i.e., Euler angles, quaternions, etc.) of the node may be changed.

Figure 5D:
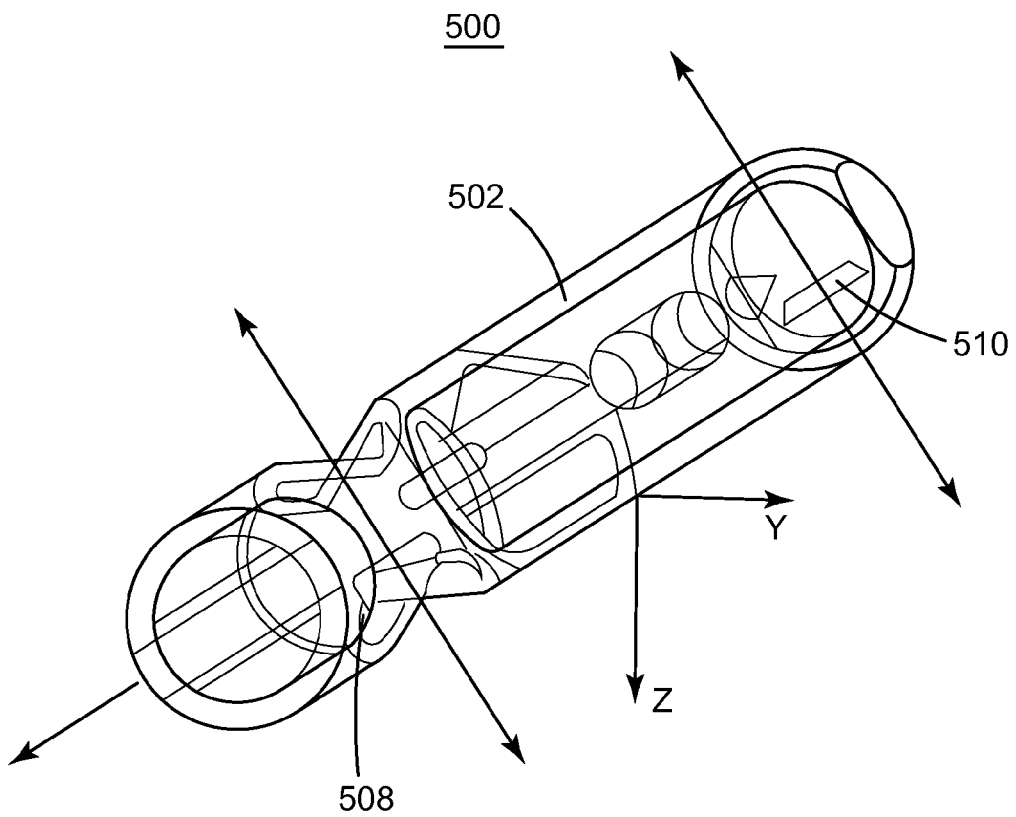

For providing lateral movement capabilities, two or more jet pumps 520, 522 or 524 are also inside the main body 502 of the node 500. The embodiment illustrated in FIGS. 5A-C uses three jet pumps located symmetrically in the main body, around the central axis Z, for easier control of the node. In one application, the three jet pumps are about 120° relative to each other. In still another application, each jet pump is between two adjacent thrusters (e.g., a jet pump makes an angle of about 60° with an adjacent thruster in a plane XOY perpendicular to the central axis Z). The jet pumps are fluidly connected to corresponding jet channels 520a, 522a and 524a and are configured to eject water along a desired direction, for example, direction A (i.e., from within the space 503 toward the outside of the main body 502), as shown in FIGS. 5A-B. The jet channels extend all the way through the main body 502. In one application, the jet channels are substantially perpendicular on the thruster channels, i.e., the jet channels extend within the plane XOY. By selectively controlling the jet pumps, the control unit is capable of driving the node 500 in the plane XOY that is parallel with the water's surface, while the thrusters may be used to drive the node along the central axis Z. However, note that by actuating the thrusters with different speeds, the control unit is also capable of controlling the roll, pitch and yaw of the node as illustrated in FIG. 5D.

Figure 6:
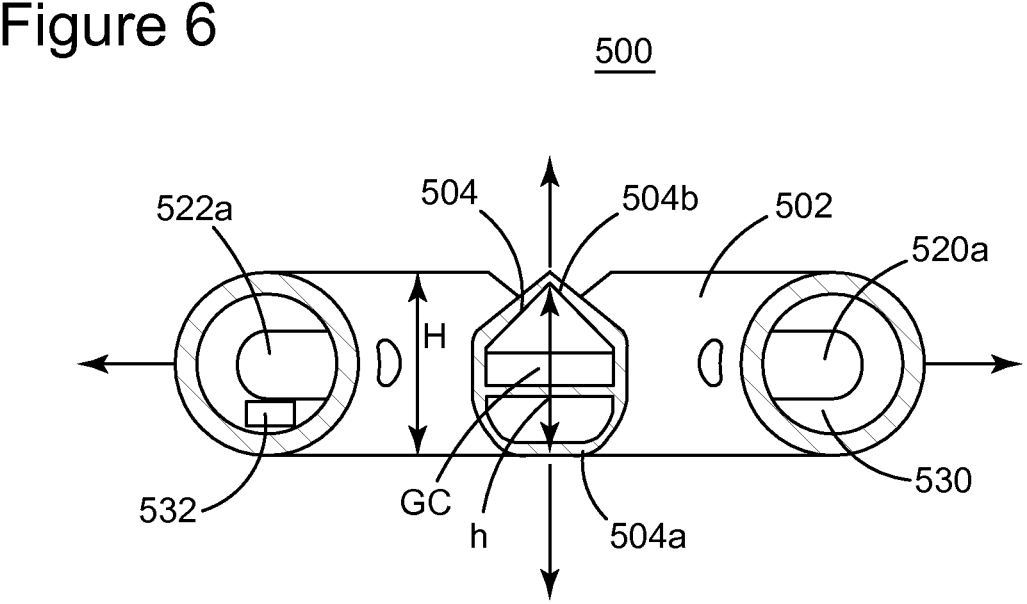
FIG. 6 illustrates a cross-section of a marine node having a torus shape according to an exemplary embodiment.

FIG. 6 illustrates a cross-section through the main body 502 and the central body 504. Note that the jet channels 520a and 522a are visible inside the main body 502. The empty space 530 inside the main body 502 is insulated from the ambient water and, thus, the empty space 530 may be used to store (e.g., as batteries) the electric power necessary for actuating the control unit, the thrusters, the jet pumps, etc. A battery 532 is schematically shown inside the main body 502; it may be shaped to occupy the empty space 530. In an exemplary embodiment, batteries are symmetrically distributed inside the main body 502 so that the center of mass of the main body coincides with the geometrical center GC of the node 500. Alternatively, depending on the number of batteries and their distribution, the node's center of mass may be below the geometrical center of the node, i.e., have the same X and Y coordinates by Z is different. This configuration has the advantage of stabilizing the roll and pitch moments, thus, helping the node's navigation. In another application, the central body's center of mass, including the equipment provided inside the central body, may also coincide with the geometrical center GC.

The central body 504 may have any desired shape. FIG. 6 shows the central body 504 with a flat surface at one end 504a and a pointed surface at the opposite end 504b. The height h of the central body 504 may be substantially the same as the height H of the main body 502. However, the two heights h and H may differ, i.e., h may be larger than H. In one application, the surface of the central body that will contact the ocean bottom is pointed so that good coupling contact between the ocean bottom and the sensors is achieved. Other shapes may be used as will be appreciated by those skilled in the art.

Figure 7:
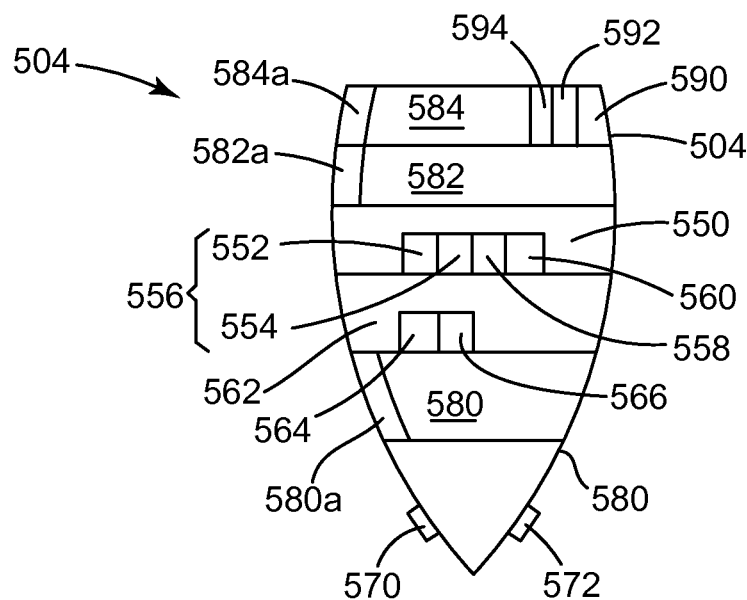
FIG. 7 illustrates a cross-section of a central body of a marine node according to an exemplary embodiment.

Inside the central body 504 may be one or more cavities, as illustrated in FIG. 7. A first cavity 550 may be configured to house at least a processor 552 and a memory 554 that form the control unit 556. Optionally, the first cavity 550 may house other devices, e.g., a communication device 558 (wireless communication device for downloading recorded seismic data to a mother vessel), an inertial measurement unit (an electronic device that measures and reports on a craft's velocity, orientation and gravitational forces, using a combination of accelerometers and gyroscopes, sometimes also magnetometers) 560, etc.

All these devices 552 to 560 may be electrically connected to each other such that the control device may control the position of the node. The processor 552 is also connected to the thrusters and the jet pumps for determining and maintaining the node's correct trajectory. Another cavity 562 or the same cavity 550 may include a pressure sensor 564 for determining ambient water pressure, and/or an altimeter 566 (alternatively, the altimeter 566 may be placed inside the main body 502, in space 530, to face the sea bottom) for determining the distance of the node from the ocean bottom, and other equipment typical for a seismic node. Seismic sensors 570 and/or 572 may be outside the central body 504, on a surface 580 expected to contact with the ocean bottom. The seismic sensors may include one or more hydrophones, geophones, accelerometers, etc. The central body 504 may also include a GPS system 590 for determining its position when floating on the water's surface, and/or an acoustic transceiver 592 to be used to exchange, via acoustic signals, data (e.g., positioning information) with the mother vessel. The mother vessel can be used as a reference for other nodes using acoustic communication, in order to increase the landing precision of other nodes.

One or more cavities 580, 582 and 584 may be used to modify the buoyancy of the entire node. Although the figures show these cavities distributed on the central body, one or more of them may be distributed in the main body. As will be discussed later, the control unit 556 may open (or pump) one or more of the cavities 580, 582 and 584 so that ambient water enters these cavities, decreasing the node's buoyancy. Further, the control unit is also configured to activate actuators (e.g., water removal pumps, electro-valves that release compressed gas (air or CO2)) 580a, 582a and 584a to remove water from inside the cavities 580, 582 and 584, totally or partially, so that the node's buoyancy is increased.

Figure 8:
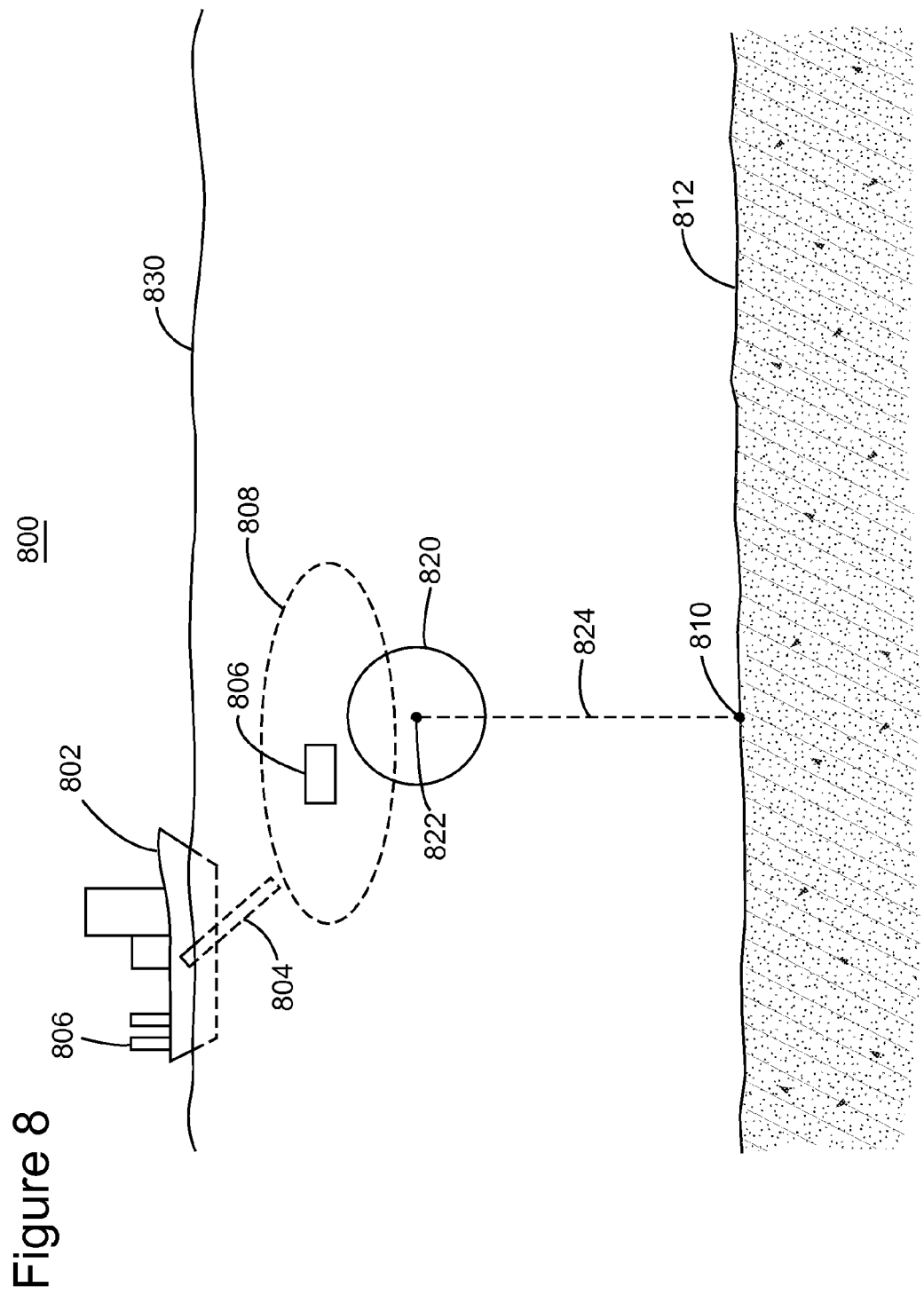
FIG. 8 illustrates a seismic survey system and how a marine node is driven to the ocean bottom according to an exemplary embodiment.

Deployment and retrieval of the node is now discussed. FIG. 8 shows a seismic surveying system 800 that includes a deployment vessel 802 which stores plural seismic nodes 806. A deployment system 804 is used to launch at least a node 806 into the water. The vessel 802 releases the node 806 within a predetermined launch area 808, which is calculated prior to launching the node 806 to correspond approximately with a target landing point 810 on or above the ocean bottom 812. In one application, the diameter of the launch area 808 is about 20 m or less. Other values may be used depending on the type of survey, the depth of the target landing point, the strength of the water currents, etc. The deployment vessel may be a traditional vessel that can handle hundreds if not thousands of nodes or a much smaller vessel, e.g., an autonomous vehicle that is capable to handle tens of nodes and interacts with the larger vessel to receive or deliver other nodes. The smaller vessel may be propelled by solar energy, wind energy and may have similar equipment with a traditional vessel.

After the node 806 is launched, it needs to use its jet pumps to position itself inside an approach area 820, which may be located, partially or totally, inside the launching area 808. In one embodiment, the approach area 820 may be completely outside the approach area 820. The approach area may have a diameter of about 10 m or less. Note that the node 806 has positive buoyancy during this phase and, thus, it floats on the water's surface. The control unit 556, using either the GPS system 590 or acoustic transceiver 592, determines its surface target position 822, which may correspond to the target landing point 810, and using its jet pumps navigates toward the surface target position 822, a point inside the approach area 820. In one embodiment, the surface target position 822 is in the center of the approach area 820. In another embodiment, the surface target position 822 is on the same vertical as the target landing point 810.

When the control unit 556 determines that the node has reached the surface target position 822, the following approaches may be followed. In one approach, the control unit 556 floods one or more of the chambers 580, 582 or 584 to achieve overall neutral node buoyancy and activates the thrusters 508, 510 and 512 to move the node along a vertical path 824 toward the target landing point 810. If no strong water currents are determined (e.g., measured by the node itself or acoustic signals received by the mother vessel about the water currents), the jet pumps are not activated. However, according to another approach, the jet pumps may be activated to correct the node's vertical trajectory. For this approach, the node may receive information from the deployment vessel, through the acoustic transceiver 592, to correct its trajectory. The deployment vessel 802 may use its own systems to detect the actual position of the target landing point 810 and to provide this position to the node for correction purposes. Alternatively, the node may have enough intelligence on board (e.g., live measurements and/or an inertial navigation system) for determining on its own the corrections to be applied during its descent toward the target landing point.

The control unit may be configured to use the thrusters with a first speed while the node is descending, and then to reduce that speed before the node lands. Landing speed may be predetermined so that the central body achieves a good coupling with the ocean bottom, but at the same time, the node does not land too hard on the ocean bottom and damage the main and/or central body. To achieve these goals, the node may include a depth sensor 594 and/or a pressure gauge and/or an altimeter for estimating time to landing and speed.

Another approach for navigating from the surface target position 822 to the target landing point 810 is now described. Instead of making node buoyancy neutral, the control unit may be configured to make node buoyancy negative after the node has reached the surface target position. Thus, the node may follow the vertical path 824 unassisted by the thrusters. Depending on water currents, the jet pumps may be used to correct the node's trajectory. In one application, the thrusters may be activated to expedite the node's descent.

After the node contacts the ocean bottom at least with the central body, the control unit may instruct all the chambers to be fully flooded, if not already flooded, to ensure a good coupling with the water and/or mud. The seismic sensors are used to record the seismic waves generated by a seismic source towed by a vessel. Once acquisition of the seismic data is completed, the node may receive a signal, e.g., from a vessel, for resurfacing. In one application, the node has an internal clock and counts to a predetermined time since landing and resurfaces on its own when that time has elapsed.

To detach itself from the ocean bottom, the control unit may activate actuators 580a, 582a and 584a to remove the water from the chambers 580, 582 and 584 and produce positive buoyancy, which makes the node to detach itself from the mud, freeing the propellers. After the node gains some altitude, the control unit may instruct the thrusters to reverse their propellers' direction to help the node move upward, toward the water's surface 830. In one application, the control unit may instruct simultaneously (i) the actuators to remove the water from the chambers and (ii) the thrusters to move the node upward. In still another exemplary embodiment, the control unit may use only the thrusters to move the node upward.

Once the node arrives at the water's surface, a vessel may recover the node and bring it on board for removing the data and maintenance. In one application, the node may use its jet pumps to navigate to a recovery position transmitted by the recovery vessel or pre-established at the beginning of the seismic survey. In another application, the control unit may make the node's overall buoyancy neutral and maintain it below the water surface, at a predetermined depth, in anticipation of collection onto a vessel.

A method that implements the above-noted processes is now discussed with reference to FIG. 9. According to FIG. 9, the method drives a marine node between first and second points in a body of water for a marine seismic survey. In one exemplary embodiment, the first point is where the marine node is launched from the vessel, and the second point is the landing point 810. Other points may be selected as first and second points. The method includes a step 900 of ejecting the marine node from a vessel in a launch area, a step 902 of moving the marine node from the launch area to an approach area on the body of water's surface, wherein one or more jet pumps on the node's main body are activated to move it, a step 904 of activating one or more thrusters in the main body to drive the marine node from the approach area to a target landing point, and a step 906 of recording seismic waves with a seismic sensor on the central body of the marine node.

In one exemplary embodiment, the node autonomously moves at the water surface and underwater, i.e., no AUV or tether is required for navigating (i) between two points at the surface of the water, (ii) two points underwater or (iii) one point at the surface of the water and one point underwater. Although in one application the node receives positioning information from the vessel, in another application the node is configured to travel to the final target position without aid from the vessel. Thus, the term "autonomous" refers to the notion of traveling (with no force applied from outside the node through a cable or AUV) with or without receiving positioning information from a vessel.

In one embodiment, the node and its content are made such that overall buoyancy is neutral. In another embodiment, the node's overall buoyancy is negative. The node may include a hydrophone and three geophones, thus having a 4C (four component) seismic sensor. Other combinations of seismic sensors are possible, i.e., 2C, 3C, etc. Weight distribution of the node may be achieved such that the mass of the bottom part of the node (e.g., first half of the node) is larger than the mass of the top part (e.g., second half of the node). This feature ensures a given directionality (orientation) of the node while travelling. The data recorded by the node may be transmitted through a wired or wireless interface to the mother vessel when the node is recovered.

As the deployment vessel is launching the nodes, a shooting vessel may follow the deployment vessel for generating seismic waves. The shooting vessel may tow one or more seismic source arrays. The shooting vessel or another vessel, e.g., the recovery vessel, may then instruct selected nodes to resurface so they can be collected as noted above. Alternatively, the recovery vessel may use a remote-operated vehicle to collect the nodes from the ocean floor. In one embodiment, the deployment vessel also tows source arrays and shoots them as it deploys the nodes.

In one exemplary embodiment, the number of nodes deployed during a seismic survey is in the thousands. Thus, the deployment vessel is configured to hold all of them at the beginning of the survey and then to launch the nodes as the seismic survey advances. If the shooting vessel is configured to retrieve the nodes, when the number of available nodes at the deployment vessel is below a predetermined threshold, the shooting vessel and the deployment vessel are instructed to switch positions in mid-seismic survey. If a dedicated recovery vessel is used to recover the nodes, then the deployment vessel is configured to switch positions with the recovery vessel when the deployment vessel approaches the predetermined threshold.

In an exemplary embodiment, the seismic survey is performed as a combination of seismic sensors located on the nodes and on streamers towed by the deployment vessel, by the shooting vessel, or by both of them.

Note that a general computing device, which is modified with specific software instructions to generate an image of the subsurface, processes the data collected by the nodes discussed in the above descriptions. The amount of data may be large, e.g., on the order of terabytes, and therefore it is impractical, if not impossible, for a person to process this data manually. Thus, any processing claim, if present in this application, is related to computer processing and is not intended to cover mental acts of data processing.

One or more of the exemplary embodiments discussed above discloses a water-coupled node configured to perform seismic recordings. It should be understood that this description is not intended to limit the invention. On the contrary, the exemplary embodiments are intended to cover alternatives, modifications, and equivalents, which are included in the spirit and scope of the invention as defined by the appended claims. Furthermore, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine node for recording seismic waves underwater, the node comprising:
    a main body having a torus shape defining a space surrounded by the main body, a central axis (Z) passing through the space and an interior insulated from ambient water;
    a central body disposed inside the space, the central body separated from and connected to the main body through at least a link;
    a first thruster provided in the main body and configured to propel the main body along the central axis; and
    a seismic sensor configured to record the seismic waves underwater.

2. The marine node of claim 1, wherein the node is configured to autonomously move at a water surface and underwater.

3. The marine node of claim 1, wherein the seismic sensor is provided on the central body.

4. The marine node of claim 1, further comprising:
    a second thruster provided in the main body; and
    a third thruster provided in the main body,
    wherein the first to third thrusters are symmetrically provided in the main body around the central axis.

5. The marine node of claim 1, further comprising:
    a first jet pump provided in the main body and configured to eject water such that the node moves in a plane (XOY) substantially perpendicular to the central axis (Z).

6. The marine node of claim 5, wherein the first thruster is provided inside a first thruster channel and the first jet pump is provided in fluid communication with a first jet channel, the first thruster channel and the first jet channel are substantially perpendicular to each other, and the first thruster channel and the first jet channel extend through the main body.

7. The marine node of claim 5, further comprising:
    a second jet pump provided in the main body; and
    a third jet pump provided in the main body,
    wherein the first to third jet pumps are symmetrically provided in the main body around the central axis.

8. The marine node of claim 1, further comprising:
    a battery disposed in the interior the main body;
    a control unit provided inside the central body and connected to the battery and the first thruster to control the first thruster;
    communication equipment provided inside the central body and configured to exchange location information with a vessel; and
    at least one buoyancy chamber inside the central body and configured to receive sea water for controlling an overall buoyancy of the node.

9. The marine node of claim 1, wherein a height H of the main body along the central axis is substantially equal to a height h of the central body along the central axis.

10. The marine node of claim 1, wherein the central body has a pointed end configured to couple with the ocean bottom.

11. The marine node of claim 10, wherein the seismic sensor is provided on an outside surface of the pointed end of the central body.

12. The marine node of claim 1, wherein the seismic node includes at least one of a hydrophone, geophone, or accelerometer.

13. The marine node of claim 1, further comprising:
    a global positioning system provided on the central body and configured to acquire a geographical location of the node.

14. A marine node for recording seismic waves underwater, the node comprising:
    a main body having a torus shape defining a space surrounded by the main body, a central axis (Z) passing through the space and an interior insulated from ambient water;
    a central body disposed inside the space, the central body separated from and connected to the main body through at least a link;
    three thrusters provided inside the main body and configured to propel the main body along the central axis;
    three jet pumps provided inside the main body and configured to propel the main body in a plane XOY substantially perpendicular to the central axis (Z); and
    a seismic sensor provided on the central body and configured to record the seismic waves underwater.

15. The marine node of claim 14, further comprising:
a global positioning system provided on the central body and configured to acquire a geographical location of the node;
a battery disposed in the interior of the main body and configured to provide electric energy;
a control unit connected to the battery to receive the electric energy, and connected to the global positioning system, to the three thrusters and to the three jet pumps to drive the node from a launch area to a target landing point on the ocean bottom.

16. A method for driving a marine node between first and second points in a body of water for a marine seismic survey, the method comprising:
launching the marine node from a vessel in a launch area;
moving the marine node from the launch area to an approach area at a surface of the body of water, wherein one or more jet pumps provided inside a main body of the marine node are activated to move the marine node;
activating one or more thrusters, provided inside the main body, to drive the marine node from the approach area to a target landing point; and
recording seismic waves with a seismic sensor located on a central body of the marine node separate from the main body,
wherein the main body has a torus-shape defining a space surrounded by the main body and an interior insulated from the body of water, the central body disposed in the space and connected via a link to the main body.

17. The method of claim 16, further comprising:
further activating the jet pumps, while the marine body is descending toward the target landing point, to correct a position of the marine node in a plane substantially parallel to the surface of the body of water.

18. The method of claim 16, further comprising:
changing an overall buoyancy of the marine node by flooding one or more chambers while the marine node is underwater.

19. The method of claim 16, further comprising:
after the marine node has coupled with a bottom of the body of water, making positive an overall buoyancy of the marine node to detach the marine node from the bottom.

20. The method of claim 19, further comprising:
activating the one or more thrusters to drive the marine node from the target landing point toward the surface of the body of water.

* * * * *